(12) United States Patent
Molah

(10) Patent No.: US 9,102,546 B2
(45) Date of Patent: Aug. 11, 2015

(54) APPARATUS FOR DISTILLATION OF WATER AND METHODS FOR USING SAME

(75) Inventor: Tawfeek Ahmed Mohammed Molah, Jeddah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 662 days.

(21) Appl. No.: 13/526,838

(22) Filed: Jun. 19, 2012

(65) Prior Publication Data

US 2013/0068607 A1    Mar. 21, 2013

Related U.S. Application Data

(60) Provisional application No. 61/536,782, filed on Sep. 20, 2011.

(51) Int. Cl.
| | |
|---|---|
| C02F 1/14 | (2006.01) |
| B01D 1/06 | (2006.01) |
| B01D 3/02 | (2006.01) |
| C02F 1/04 | (2006.01) |
| B01D 5/00 | (2006.01) |
| B01D 1/00 | (2006.01) |
| C02F 103/08 | (2006.01) |

(52) U.S. Cl.
CPC . *C02F 1/14* (2013.01); *B01D 1/007* (2013.01); *B01D 1/0035* (2013.01); *B01D 1/06* (2013.01); *B01D 3/02* (2013.01); *B01D 5/006* (2013.01); *C02F 1/04* (2013.01); *C02F 2103/08* (2013.01); *C02F 2201/003* (2013.01)

(58) Field of Classification Search
CPC ........... C02F 1/04; C02F 1/14; B01D 1/0035; B01D 1/06; B01D 3/02; B01D 5/006
USPC ..................... 202/163, 232; 203/10
See application file for complete search history.

(56) References Cited

U.S. PATENT DOCUMENTS

| | | | |
|---|---|---|---|
| 2,317,101 A | 4/1943 | Lecky | |
| 2,332,294 A | 10/1943 | Bohmfalk | |
| 2,412,466 A | 12/1946 | Miller, Jr. | |
| 3,232,846 A | 2/1966 | Kimmerle | |
| 3,337,418 A | 8/1967 | Halacy, Jr. | |
| 3,367,843 A * | 2/1968 | Clive et al. | 202/176 |
| 3,397,117 A * | 8/1968 | Smith et al. | 202/234 |
| 3,415,719 A * | 12/1968 | Telkes | 202/83 |
| 3,960,668 A | 6/1976 | Rush | |
| 4,160,523 A | 7/1979 | Stevens | |
| 4,194,949 A | 3/1980 | Stark | |
| 4,749,447 A | 6/1988 | Lew | |
| 4,882,012 A * | 11/1989 | Wasserman | 202/176 |

(Continued)

*Primary Examiner* — In Suk Bullock
*Assistant Examiner* — Jonathan Miller
(74) *Attorney, Agent, or Firm* — Abelman, Frayne & Schwab

(57) ABSTRACT

An apparatus and method for distilling fresh water from sea, and brackish water are disclosed. In essence, an inverted, Y-shaped structure is configured such that each leg of the figure contains two, concentric pipe means. One pipe means institutes the exterior of the leg, and is translucent. The smaller pipe means is positioned inside the first, and a vacuum exists between the two. Water is permitted to enter the pipe means, via a further pipe means in communication with the source of the water. When the water rises in the legs of the apparatus, concentrated heat provided via, e.g., Fresnel lenses, acts to evaporate the water, resulting in separation of salt and impurities therefrom. Pure water condenses in the device and accumulates in a reservoir provided for this purpose.

7 Claims, 2 Drawing Sheets

(56) References Cited

U.S. PATENT DOCUMENTS

| | | |
|---|---|---|
| 5,468,351 A | 11/1995 | Hirota et al. |
| 5,729,987 A * | 3/1998 | Miller .............................. 62/98 |
| 7,811,420 B2 * | 10/2010 | Sonander ......................... 203/1 |
| 7,955,478 B2 | 6/2011 | McClure |
| 8,668,812 B2 * | 3/2014 | Simpson et al. ........... 202/185.1 |
| 2012/0085635 A1 * | 4/2012 | Haynes ........................... 203/11 |
| 2014/0054159 A1 * | 2/2014 | Bosch I Bosch ................ 203/10 |

* cited by examiner

APPARATUS FOR DISTILLATION OF WATER AND METHODS FOR USING SAME

CROSS-REFERENCE TO RELATED APPLICATIONS

This application claims priority of provisional application Ser. No. 61/536,782, filed Sep. 20, 2011 and incorporated herein, by reference, in its entirety.

FIELD OF THE INVENTION

This invention relates to an apparatus and method for distilling fresh water from sea water or other non-fresh water samples.

BACKGROUND AND PRIOR ART

In many parts of the world fresh, potable water is not readily available or plentiful. Ironically, many of these regions are surrounded by, or have access to, virtually limitless amounts of water that is not potable because of salinity (e.g., sea water), or other mineral contaminants (e.g., brackish water).

This problem has been recognized for a long period of time, and various approaches to generating potable and, more preferably, distilled water, abound in the field. See, e.g., U.S. Pat. No. 7,955,478 describing what is referred to as a "vertical, tubular evaporation apparatus." The invention described in this patent shows that Fresnel lenses, which are a feature of one embodiment of the invention, can be used in the preparation of distilled water. The devices depicted in the '478 patent include inner an outer cylinders but do not disclose a vacuum element therebetween.

Many approaches to the field of preparing distilled water from sea water employ solar energy. See in this regard, U.S. Pat. Nos. 5,468,351 and 4,749,447, which also discuss the use of Fresnel lenses. Also teaching solar power based distilling apparatuses are U.S. Pat. Nos. 4,194,949; 4,160,523; 3,960,668; 3,232,846; 2,412,466; and 2,332,294, all of which are incorporated by reference.

Notwithstanding the interest shown, e.g., by the prior art, in apparatuses that are useful for separating impurities such as salt and other minerals from impure water, there is still a need for simple, effective devices which utilize as little energy as possible, and can also operate continuously.

It is an object of the invention to address all of these issues. How this is accomplished will be seen from the disclosure which follows.

SUMMARY OF THE INVENTION

The invention relates to a Y-shaped apparatus, each leg of which comprises two, concentric passage means, of different sizes. The larger of these is light permeable. They are positioned such that the smaller one is inside the larger one. In production, a vacuum is provided in the space in between these two passage means, referred to herein as pipe means as well.

The internal pipe means permits water to enter and exit through ports positioned at the two ends of the legs of the "Y." In operation, when heat vaporizes water in one of the legs of the device, water moves up that leg, while no water diffuses up the unheated, second leg. The resulting vapor, which contains none, or a very reduced amount of contaminants, passes into an internal, collecting pipe means positioned within the Y-shaped device. The vapor cannot escape from the internal pipe means.

The entire Y-shaped device is positioned in water, in an inverted position such that the top, vertical position extends out of the water and the legs of the apparatus positioned thereunder.

In operation, at least one, and preferably as many as 3 lenses, are positioned such that they focus and concentrate sunlight at the point where the vertical portion of the apparatus, one leg thereof, and the water, meet. The focused sunlight heats the water in the leg of the apparatus, thereby vaporizing it. The resulting vapor enters the internal collecting pipe means, while the concentrated brine moves into the second leg of the apparatus, forced therein as a result of additional sea water entering the first leg, because of space afforded by the evaporation. The vapor moves in the collecting means and, upon passage to the area under the surrounding water, cools, and condenses, forming distilled water which passes into the reservoir.

More than one lens is employed so that, as the earth moves in the course of a day and its position changes relative to the sun, light is focused continuously on the apparatus and formation of vapor, followed by condensation, is continuous.

DETAILED DESCRIPTION OF PREFERRED EMBODIMENT

Figure 1:
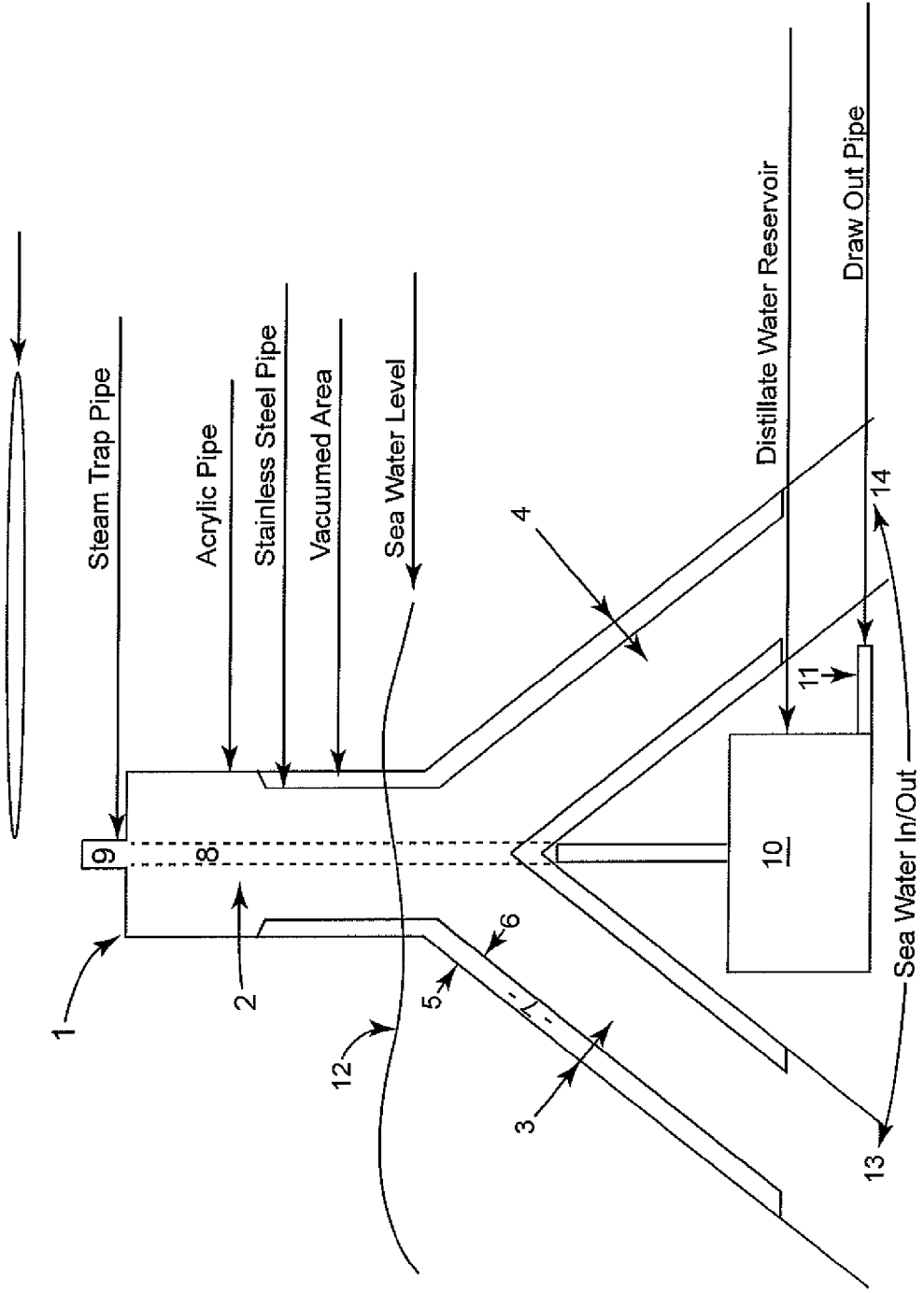
FIG. 1 depicts a front view of an embodiment of the invention.

Referring now to the drawings, FIG. 1 shows a front view of an embodiment of a portion of the invention.

FIG. 1 shows an inverted Y-shaped structure "1," which consists of a vertical portion "2" and two angled leg portions "3" and "4." The apparatus includes a housing "5," which is translucent. This housing, also referred to as a first pipe means, may be constructed of an acrylic, or any other material which is permeable to light.

A second pipe means "6" is positioned inside the first pipe means. This second pipe means is preferably constructed of non-corrosive material such as stainless steel. Element "6" has a diameter that is less than that of element "5," such that a space "7" is formed therebetween. This space is treated such that a vacuum is created between the second and first pipe means. The vacuum prevents heat dissipation following action of the lenses, discussed infra.

A vertical pipe means "8" is positioned equidistant from the sides of the housing. This vertical pipe means is equipped with an entrance port "9" into which water vapor flows, as discussed infra. It extends through structure 1, and terminates in a reservoir "10" into which condensed water vapor flows. The reservoir optionally contains a means "11" for drawing distilled liquid therefrom.

In operation, structure 1 is positioned in shallow sea or brackish water so that the water surface depicted by "12" meets the apparatus where angled leg portions 3 and 4 diverge from vertical portion 2.

Both of leg portions 3 and 4 have openings "13" and "14" which permit passage of water in and out of the apparatus.

Figure 2:
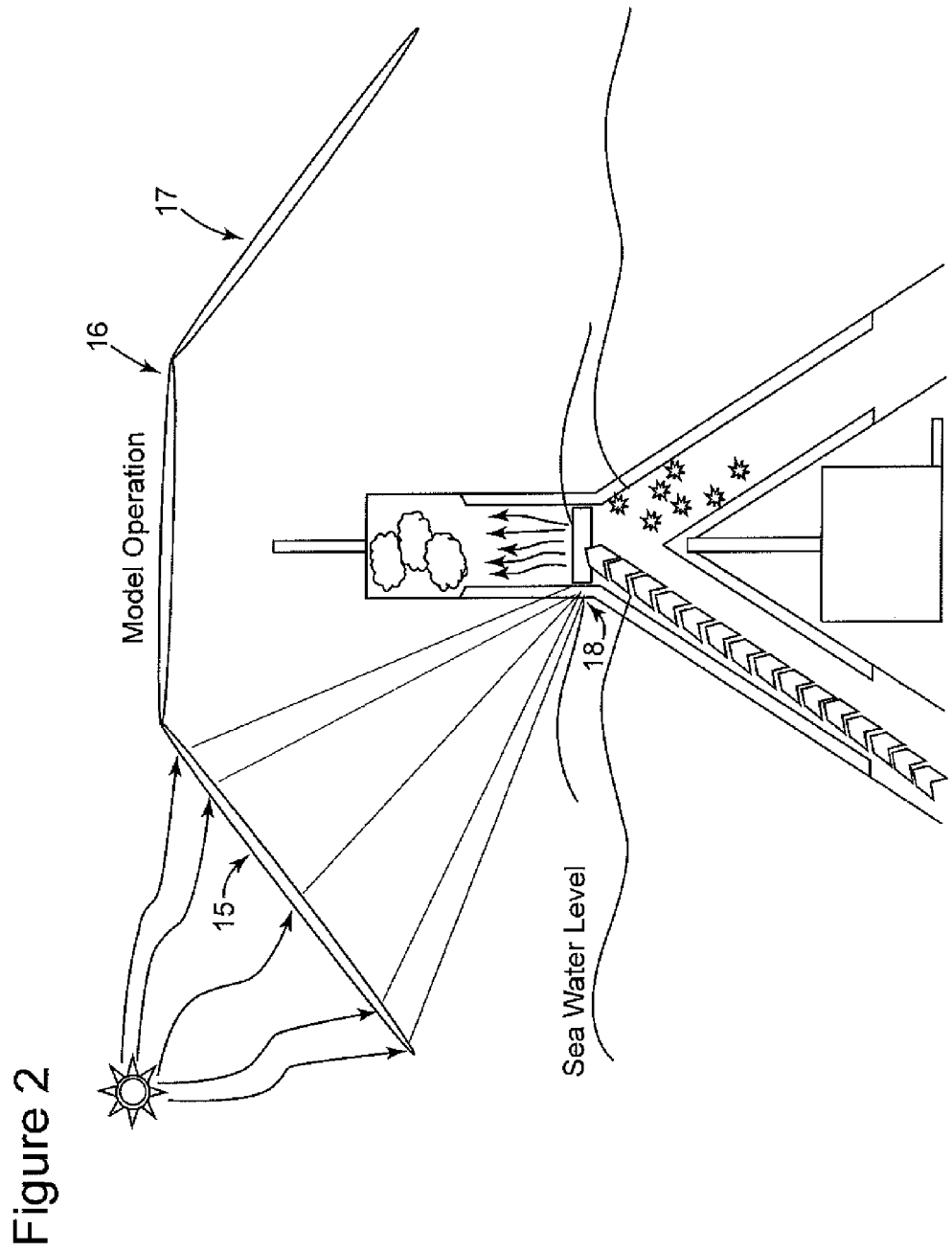
FIG. 2 shows an embodiment of the invention which shows lenses that are used in connection with it.

FIG. 2 shows an embodiment of the invention in which light focusing lenses 15-17 are displayed. The skilled artisan will know how to position these relative to "1," such that sunlight is focused at the point where vertical means "2" meets the body of water.

In operation, the lens "14" first focused the sunlight at point "18," so that water flowing up leg 3 is vaporized immediately. The water vapor enters vertical pipe means 8, with any residual brine passing down through second leg 4. As the vapor moves down vertical pipe 8, it is cooled by the surrounding body of water and condensed, flowing into the reservoir means 9.

Ideally, three lenses are deployed, as is shown in FIG. 2, so that as the position of the sun moves relative to the earth, the process described supra occurs a second time, but with the focal point of the lens being directed down on the vertical portion, i.e., the point where leg 4 diverges from vertical means 3.

Any lens will function in the invention, however, Fresnel lenses, which are well known in the art, are preferred. Such lenses provide the artisan with the ability to heat the focal point to as high as 1850° F. At this temperature, 12 ounces of water boils in approximately 87 seconds.

Other features of the invention will be clear to the artisan and will not be repeated here.

The terms and expression which have been employed are used as terms of description and not limitation, and there is not intention in the use of such terms and expression of excluding any equivalents of the features shown and described or portions thereof, it being recognized that various modifications are possible within the scope of the invention.

The invention claimed is:

1. An apparatus useful in distilling water from sea or brackish water comprising:
    (i) a first, translucent Y-shaped pipe means having a pair of angled legs diverging from a central vertical portion of said Y-shaped pipe means;
    (ii) a second, Y-shaped pipe means also having a pair of angled legs diverging from a central portion of said second, Y-shaped pipe means, wherein said second Y-shaped pipe means has a diameter less than said first Y-shaped pipe means, and is positioned in said first Y-shaped pipe means, wherein said two Y-shaped pipe means have a vacuum in between them, each of said angled legs having an opening at its end for influx or efflux of sea water,
    (iii) a medial vertical pipe means positioned in said apparatus at a point equidistant from the sides of said central portion, and having an entrance port at one end, and its second end extending through said apparatus; and
    (iv) a collection chamber for receiving condensed water from said medial vertical pipe means.

2. The apparatus of claim 1, wherein said translucent pipe means is made of an acrylic.

3. The apparatus of claim 1, wherein said second Y-shaped pipe means is made of a stainless steel.

4. The apparatus of claim 1, wherein said collection chamber further comprises an outlet means for removal of distilled water.

5. A method for distilling water from sea water, comprising:
    positioning the apparatus of claim 1 in water, in an inverted position to a depth which reaches the point where said two angled legs diverge from said central vertical portion;
    positioning a lens means at a distance and angle from said apparatus to focus heat on said apparatus at the point where one of said two angled legs diverges from said central vertical portion, to vaporize sea water which enters said angled leg;
    collecting vaporized water from said angled leg in said medial pipe means, wherein passage of said vaporized water down said medial pipe means results in condensation of said vaporized water; and
    collecting condensate in said collection means.

6. The method of claim 5, further comprising drawing condensate from said collection chamber via an outlet means.

7. The method of claim 5, further comprising positioning at least one additional lens means at a point which focuses heat at the point where the other of said two angled legs diverges from said central vertical portion.

* * * * *